(12) United States Patent
Wang et al.

(10) Patent No.: US 10,972,023 B2
(45) Date of Patent: Apr. 6, 2021

(54) POWER TOOL AND CONTROL METHOD THEREOF

(71) Applicant: Nanjing Chervon Industry Co., Ltd., Jiangsu (CN)

(72) Inventors: Hongwei Wang, Jiangsu (CN); Qian Xu, Jiangsu (CN)

(73) Assignee: NANJING CHERVON INDUSTRY CO., LTD., Nanjing (CN)

( * ) Notice: Subject to any disclaimer, the term of this patent is extended or adjusted under 35 U.S.C. 154(b) by 0 days.

(21) Appl. No.: 16/390,337

(22) Filed: Apr. 22, 2019

(65) Prior Publication Data

US 2019/0245464 A1 Aug. 8, 2019

Related U.S. Application Data

(63) Continuation of application No. PCT/CN2017/107713, filed on Oct. 25, 2017.

(30) Foreign Application Priority Data

Nov. 1, 2016 (CN) .......................... 201610940637.8

(51) Int. Cl.
*H02P 6/15* (2016.01)
*H02P 6/28* (2016.01)
(Continued)

(52) U.S. Cl.
CPC .............. *H02P 6/153* (2016.02); *B24B 47/12* (2013.01); *B24B 49/16* (2013.01); *B25F 5/00* (2013.01);
(Continued)

(58) Field of Classification Search
CPC . H02P 29/40; H02P 6/00; H02P 25/18; B24B 47/12; B24B 49/16; B25F 5/00
See application file for complete search history.

(56) References Cited

U.S. PATENT DOCUMENTS

| 9,634,591 B2* | 4/2017 | Qian ......................... H02P 6/16 |
| 2009/0102437 A1 | 4/2009 | Nakagawa |

(Continued)

FOREIGN PATENT DOCUMENTS

| CN | 103956943 A | 7/2014 |
| CN | 104242749 A | 12/2014 |

(Continued)

OTHER PUBLICATIONS

International Search Report of the International Searching Authority dated Jan. 17, 2018, issued in connection with International Application No. PCT/CN2017/107713 (6 pages).

(Continued)

*Primary Examiner* — Said Bouziane
(74) *Attorney, Agent, or Firm* — McCarter & English, LLP (57) ABSTRACT

A power tool and a control method of the power tool are provided. The power tool includes a rotor and a stator having a first phase winding, a second phase winding and a third phase winding; a power supply module configured to power the motor; a drive circuit configured to electrically connecting the power module to at least two of the first phase winding, the second winding, and the third phase winding; a controller configured to control the drive circuit to connect the first phase winding, the second phase winding, and the third phase winding to the power supply module according to a rotational position of the rotor.

10 Claims, 7 Drawing Sheets

(51) Int. Cl.
*B24B 47/12* (2006.01)
*B24B 49/16* (2006.01)
*H02P 29/40* (2016.01)
*H02P 25/18* (2006.01)
*B25F 5/00* (2006.01)
*H02P 6/00* (2016.01)

(52) U.S. Cl.
CPC .................. *H02P 6/00* (2013.01); *H02P 6/28* (2016.02); *H02P 25/18* (2013.01); *H02P 29/40* (2016.02); *H02P 2203/03* (2013.01)

(56) References Cited

U.S. PATENT DOCUMENTS

| 2014/0062364 | A1* | 3/2014 | Petri | H02P 6/30 |
| | | | | 318/400.34 |
| 2014/0139153 | A1* | 5/2014 | Aoki | H02P 6/22 |
| | | | | 318/400.1 |
| 2018/0248507 | A1* | 8/2018 | Vanko | B25F 5/00 |

FOREIGN PATENT DOCUMENTS

| CN | 104716874 A | 6/2015 |
| CN | 104753411 A | 7/2015 |

OTHER PUBLICATIONS

Written Opinion of the International Searching Authority dated Jan. 17, 2018, issued in connection with International Application No. PCT/CN2017/107713 (3 pages).

\* cited by examiner

POWER TOOL AND CONTROL METHOD THEREOF

CROSS-REFERENCE TO RELATED APPLICATIONS

This application is a continuation of international patent application No. PCT/CN2017/107713 filed on Oct. 25, 2017, which claims priority to Chinese patent application No. 201610940637.8, entitled "ELECTRIC TOOL AND CONTROL METHOD THEREOF" and filed on Nov. 1, 2016. The disclosures of the international patent application and the Chinese patent application are incorporated therein by reference in their entireties.

TECHNICAL FIELD

The present disclosure relates generally to a power tool and a control method of the power tool.

BACKGROUND

A power tool includes a brushless motor and functional accessory. The functional accessory is capable of being driven by rotation of the brushless motor to implement a function such as cutting.

The brushless motor generally includes a motor body and a drive circuit. Compared to a brush motor, the brushless motor has lower operating noise and longer life. Generally, according to whether or not there is a sensor for detecting a position of a rotor, the brushless motor is divided into a brushless motor which is controlled with a sensor and a brushless motor which is controlled without a sensor. The position arrangement of the sensor and a cooperation between the sensor and the control method are important factors affecting the performance of brushless motors.

When the functional accessory of the power tool is subjected to a large resistance, the brushless motor is in a heavy load state. In the heavy load state, the current of the armature winding of the brushless motor is large, and the torque is low. The large current and the low torque may reduce the performance of the tool and affect the user's experience.

The statements in this section merely provide background information related to the present disclosure and may not constitute prior art.

SUMMARY

In one aspect of the disclosure, a power tool includes a motor, including a rotor and a stator, where the stator includes a first phase winding, a second phase winding and a third phase winding; a power supply module configured to power the motor; a drive circuit configured to cause the power supply module to be electrically connected to at least two of the first phase winding, the second winding, and the third phase winding; a controller configured to control the drive circuit according to a rotational position of the rotor to connect the first phase winding, the second phase winding, and the third phase winding to the power supply module.

Furthermore, the power supply module includes a positive terminal and a negative terminal, the power supply module generates a potential difference between the positive terminal and the negative terminal. The controller is configured to control the drive circuit to first connect the first phase winding to the positive terminal and connect the second phase winding to the negative terminal, and then connect the third phase winding to the positive terminal when the rotor rotates to a preset rotational position.

Furthermore, the power supply module includes a positive terminal and a negative terminal, the power supply module generates a potential difference between the positive terminal and the negative terminal; the controller is configured to control the drive circuit to first connect the first phase winding and the second phase winding to the positive terminal or the negative terminal respectively, then connect the third phase winding to the positive terminal when the rotor rotates to a preset rotational position; and then disconnect the first phase winding and the positive terminal.

Furthermore, the controller is configured to start timekeeping when the rotor rotates to the first preset rotational position, and connect the third phase winding to the power negative when a preset duration elapsed.

Furthermore, the drive circuit has a plurality of drive switch and operable to turn on the electrical connection of the third phase winding to the power supply module at a certain duty cycle under the control of the controller; the controller configured to control the drive switch to turn on the third phase winding and the power supply module at a varying duty cycle when the rotor is positioned between the first preset rotational position and the second preset rotational position.

Furthermore, the power supply module comprising a positive terminal and a negative terminal, the power supply module generates a potential difference between the positive terminal and the negative terminal. The controller is configured to control the drive circuit to first connect the first phase winding and the second phase winding to the positive terminal or the negative terminal respectively, then connect the third phase winding phase winding to the negative terminal when the rotor rotates to a preset rotational position.

Furthermore, the power supply module includes a positive terminal and a negative terminal, the power supply module generates a potential difference between the positive terminal and the negative terminal; the controller is configured to control the drive circuit to first connect the first phase winding to the positive terminal and connect the second phase winding to the negative terminal, and then connect the third phase winding to the positive terminal when the rotor rotates to a preset rotational position.

Furthermore, the controller is configured to start timekeeping when the rotor rotates to the first preset rotational position, and connect the third phase winding to the power negative when a preset duration elapsed.

Furthermore, the controller electrically connects to the drive circuit and is configured to send a control signal to the drive circuit so that the voltage of the third phase winding varies with the rotational position of the rotor.

Furthermore, the controller electrically connects to the drive circuit and is configured to send a control signal to the drive circuit so that the voltage of the third phase winding varied with rotational position of the rotor at a varying slope.

Furthermore, the controller electrically connects to the drive circuit and is configured to send a control signal to the drive circuit so that the voltage of the third phase winding varied with rotational position of the rotor at a preset slope.

In another aspect of the disclosure, a control method for controlling a power tool is provided. The power tool includes: a rotor and a stator, where the stator includes a first phase winding, a second phase winding and a third phase winding; a power supply module having a positive terminal and a negative terminal, which is configured to generate a potential difference between the positive terminal and the negative terminal. The method includes electrically connecting the first phase winding and the second phase winding to the positive terminal or the negative terminal; detecting a position of the rotor; and then electrically connecting the third phase winding to the positive terminal when the rotor rotates to a preset rotational position.

Furthermore, the control method also includes electrically connecting the third phase winding to the positive terminal when the rotor rotates to a first preset rotational position; and then electrically disconnecting the first phase winding to the positive terminal when the rotor rotates to a second preset rotational position.

Furthermore, the control method also includes starting timekeeping when the rotor rotates to the first preset rotational position, and electrically connecting the third phase winding to the negative terminal when a preset duration elapsed.

Furthermore, when the rotor is positioned between the first preset rotational position and the second preset rotational position, the voltage of the third phase winding is varied with the rotational position of the rotor.

Furthermore, when the rotor is positioned between the first preset rotational position and the second preset rotational position, the voltage of the third phase winding is varied with rotational position of the rotor at a preset slope.

Further areas of applicability will become apparent from the description provided herein. It should be understood that the description and specific examples are intended for purposes of illustration only and are not intended to limit the scope of the present disclosure.

The drawings described herein are for illustrative purposes only of exemplary embodiments and not all possible implementations, and are not intended to limit the scope of the present disclosure. Corresponding reference numerals indicate corresponding parts throughout the several views of the drawings.

DETAILED DESCRIPTION

The following description of the preferred embodiments is merely exemplary in nature and is in no way intended to limit the disclosure, its application, or uses.

Figure 1:
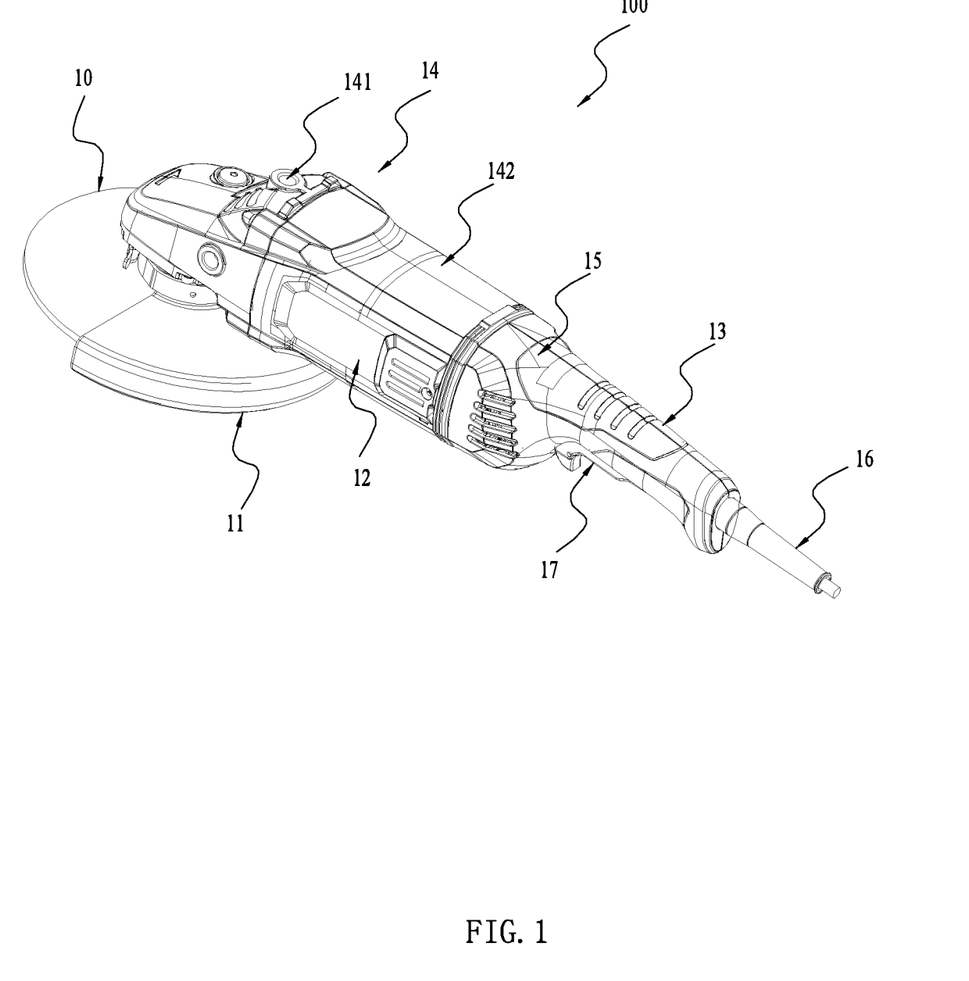
FIG. 1 is a perspective view of one embodiment of a power tool.
Figure 2:
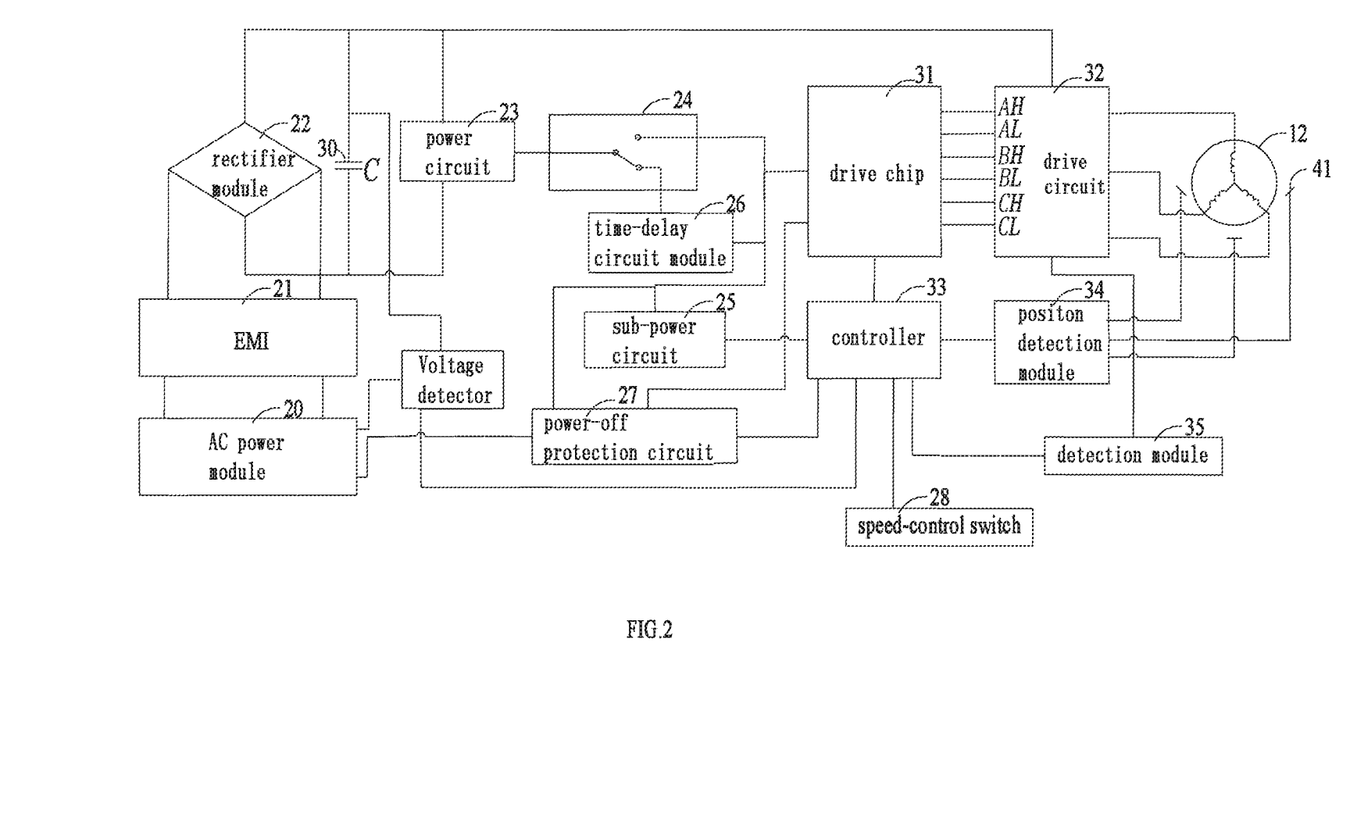
FIG. 2 is a circuit block diagram of a motor drive system of the power tool shown in FIG. 1.

Referring to FIG. 1 and FIG. 2, a grinder 100 includes a grinder wheel 10, a guard 11, an output shaft (not shown), a motor 12, a handle 13, a transmission mechanism (not shown), a housing 14, and a brake device 15.

The grinder wheel 10 is used for grinding or cutting. At least a portion of the guard 11 covers the grinder wheel 10 to perform a protective function. The output shaft is used to mount or secure the grinder wheel 10. The motor 12 drives the output shaft to rotate. Generally, the motor includes a rotor, a stator and a motor shaft. The transmission mechanism connects the output shaft and the motor shaft, and transfers the driving force of the motor shaft to the output shaft. The housing 14 is used to mount or fixed the motor 12. The handle 13 is used for being held by a user. The handle 13 may be formed as a separate part of the housing 14 or may be formed from the housing 14. The housing 14 includes a head housing 141 and a main housing 142. The motor 12 is fixed in the main housing 142. The head housing 141 is used for mounting the transmission mechanism. A power line 16 is operable to connect an alternating current (AC) power supply. The grinder 100 also includes an operation switch 17 for turning on or turning off the motor 12. The motor 12 is activated when the operation switch 17 is triggered, and the motor 12 is switched off when the operation switch 51 is released. The operation switch 17 is arranged at the handle 13. The brake device 15 is arranged between the handle 13 and the motor 12. The brake device 15 is capable of quickly braking the motor shaft. When the user needs to stop the rotation of the grinder wheel 10, the brake device 15 stops the motor 12 in a short time to avoid a danger.

Referring to FIG. 2, the motor drive system includes an AC power module 20, an Electro-Magnetic Interference (EMI) circuit 21, a rectifier module 22, an electrolytic capacitor 30, a power circuit 23, a drive chip 31, a drive circuit 32, a controller 33 and a position detection module 34.

The AC power module 20 is configured to access the AC power required for the motor 12. The AC power module 20 includes an alternating current plug to which alternating current can be accessed. For example, the alternating current plug can be connected to 120V or 220V AC electrical power.

The rectifier module 22 is configured to convert the AC power output from the AC power supply module 20 into pulsating DC power output. The rectifier module 22 includes a rectifier bridge having four diodes that convert alternating current into pulsating DC output in the same direction by using the unidirectional conductivity of the diode and the voltage drop of the diode.

The electrolytic capacitor 30 is electrically connected to the rectifier module 22. The electrolytic capacitor 30 is configured to convert the pulsating direct current output of the rectifier module into a smooth direct current output to reduce harmonic interference in the pulsating direct current.

In order to ensure the smooth output of the motor 12, a ratio of a difference between the maximum value of the alternating current voltage and the rated power of the motor 12 to the maximum value of the alternating current voltage is in a range from −15% to +15%.

The power circuit 23 is electrically connected to the electrolytic capacitor 30 and configured to supply power to the motor and modules in the motor drive system. The power circuit 23 includes a positive terminal and a negative terminal and generates a potential difference between the positive terminal and the negative terminal. Specially, the power circuit 23 is configured to step down the smooth DC power having a higher voltage filtered by the electrolytic capacitor 30 to output.

As shown in FIG. 2, the grinder 100 also includes a weak-current switch 24 which is configured to turn on or turn off the electrical connection between the power circuit 23 and a sub-power circuit 25. The sub-power circuit 25 is used to power the controller 32. The weak-current switch 24 is electrically connected to the power circuit 23. The sub-power circuit 25 is electrically connected to the weak-current switch 24.

When the weak-current switch 24 turns on the electrical connection between the power circuit 23 and the sub-power circuit 25, the sub-power circuit 25 receives a higher direct current from the power circuit 23 and outputs a lower direct current voltage to power the controller 33.

As the electrical connection between the power circuit 23 and the sub-power circuit 25 is cut off when the weak-current switch 24 turns off, the power circuit 23 cannot supply power to the sub-power circuit 25. When the weak-current switch 24 is turned on, the controller 33 gets power from the sub-power circuit 25 and sends a control signal to the drive circuit 32 to cause the current output from the power circuit 23 to be loaded on the windings of the brushless motor through the drive circuit 32.

The grinder 100 also includes a time-delay module 26 with a delay function. The time-delay circuit 24 is connected in series between the weak-current switch 24 and the sub-power circuit 25. When the weak-current switch 24 is turned off, the time-delay circuit 24 enables the power circuit 23 to still power the controller 33 for a period of time. The time-delay circuit 24 may include a delay capacitor.

A power-off protection circuit 27 is electrically connected to the AC power module 20, the controller 33 and the drive circuit 31 respectively. The power-off protection circuit 27 is used for power-off protection in the event of overload, short circuit or under voltage of the grinder circuit and the motor, i.e., to disconnect the electrical connection between the AC power supply module 20 and the controller 33. The power-off protection circuit 27 may be a circuit breaker, an air switch or other electronic component capable of performing a power-off function.

The weak-current switch 24 has two states of ON or OFF. In some embodiments, the weak-current switch 24 is integrated with the operation switch 51 of the grinder for operation by the user.

The drive chip 31 is connected in series between the power supply module 23 and the drive circuit 32 and configured to convert the DC voltage output from the power supply module 23 into a supply voltage capable of supplying power to the drive circuit 32.

The position detection module 34 is electrically connected with the motor 12 and configured to detect the position of the rotor of the motor 12. The position detection module 34 is in one signal state when the rotor rotates to a preset range that can be sensed by the position detection module 34, and the position detection module 34 is in another signal state when the rotor rotates out of the preset range. In some embodiment, the position detection module 34 includes Hall Sensors.

As shown in FIG. 2, three Hall sensors 41 are provided along the circumferential direction of the rotor of the motor 12, and a position signal of the rotor detected by the Hall sensors 41 is input to the position detection module 34. The position detection module 34 converts the input rotor position signal into a rotor position signal communicable with the controller 33 through logical processing and inputs the rotor position signal to the controller 33. As that rotor rotates into and out of the preset range, the signal of the Hall sensors changes and the output signal of the position detection module 34 changes accordingly.

When the rotor rotates into the preset range, the output signal of the position detection module 34 is defined as 1, and when the rotor rotates out of the preset range, the output signal of the position detection module 34 is defined as 0. In some embodiments, the three Hall sensors are set at a physical angle of 120° apart from each other.

Figure 4:
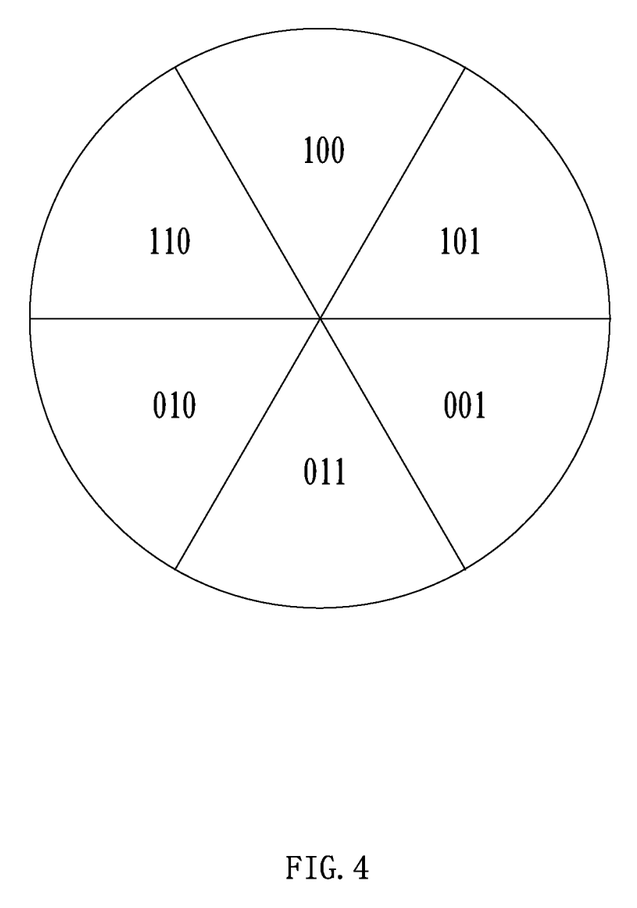
FIG. 4 is a schematic diagram of correspondence between position sensor signal and signal intervals in a power tool.

Referring to FIG. 4, when the rotor rotates, the three Hall sensors will generate a position signal with six signal combinations such that the position detection module 34 outputs a position signal having one of the six signal combinations. Six different combinations of signals 100, 110, 010, 011, 001, 101 occur if arranged in the order in which the Hall sensors are placed. Thus, the position detection module 34 can output one of the six position signals, and the position of the rotor can be obtained from the position detection signal output by the position detection module 34.

In one electrical cycle, a brushless motor with three-phase windings has six driving states corresponding to the output signal generated by the above scheme. Therefore, the brushless motor can perform one commutation when the output signal of the position detection module changes.

An input of the controller 33 is electrically connected to an output of the position detection module 34. The controller 33 is configured to output a corresponding control signal to the drive circuit 32 in accordance with the position signal input from the position detection module 34 so that the drive circuit 32 drives the motor to power up, commute, or regulate the speed.

Figure 3:
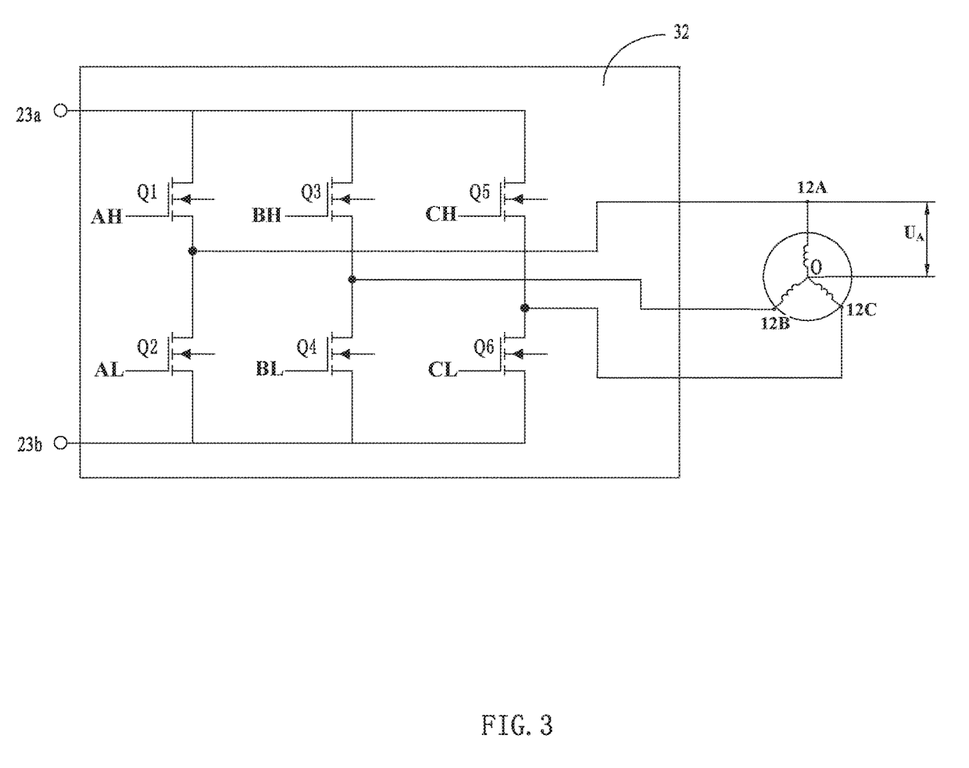
FIG. 3 is a circuit diagram of the drive circuit of FIG. 2.

The drive circuit 32 drives the motor. As shown in FIG. 3, that drive circuit 32 includes drive switches Q1, Q2, Q3, Q4, Q5, Q6. Each gate terminal AH, AL, BH, BL, CH, CL of the drive switches Q1-Q6 is electrically connected to the controller 33, and each drain or source of the drive switches is connected to a stator winding of the motor. The drive switches Q1-Q6 change the on state according to the control signal output from the controller, thereby changing the voltage state of the power supply module loaded on the windings of the brushless motor.

In order to rotate the brushless motor, the driving circuit 32 has a plurality of driving states, in which the stator winding of the motor generates a magnetic field, and the controller 33 controls the driving circuit 32 to switch the driving state to rotate the magnetic field generated by the stator winding to drive the rotor to rotate, thereby driving the brushless motor.

Taking the brushless motor shown in FIG. 3 as an example, the brushless motor includes a rotor and a stator. The stator includes a first phase winding, a second phase winding, a third phase winding, where one end of each of the three phase windings is connected to a neutral point O, and the other ends A, B, C are used as terminals of the windings which are connected to the brushless motor and winding terminals (not shown) provided by the brushless motor. The driving circuit and other peripheral circuits can be connected to the terminals A, B, C of the three-phase windings through the winding terminals.

In order to drive the brushless motor shown in FIG. 3, the driving circuit 32 has at least six driving states, and for convenience of explanation, the driving states are indicated below in a driving state corresponding to the connected terminals. For example, the controller 33 controls the drive circuit 32 to connect the first phase winding to the positive terminal and the second phase winding to the positive terminal or the negative terminal, respectively. If the first phase winding is connected to the positive pole of the power supply, that is, if the terminal A of the first phase winding is connected to the positive pole of the power supply, the driving state AB is used. If the second phase winding is connected to the positive pole of the power supply, that is, if the terminal B of the second phase winding is connected to the positive pole of the power supply, the driving state BA is used. The driving mode shown in this way is also applicable to a triangular connection scheme of the winding. In addition, the switching of the driving state may be simply referred to as a commutation operation of the brushless motor. Apparently, commutation of the rotor is performed once when the rotor rotates every 60°, and the interval between one commutation of the brushless motor and the next commutation is defined as a commutation interval.

As shown in FIG. 4, during normal operation of that brushless motor, the controller 33 controls the driving circuit 32 to sequentially output six driving states AB, AC, BC, BA, CA, and CB when the brushless motor is driven. The corresponding relationship between the driving state and the output signal of the position detection module 34 is shown in Table 1:

TABLE 1

| Signal combination | Drive Status |
| --- | --- |
| 101 | AB |
| 100 | AC |
| 110 | BC |
| 010 | BA |
| 011 | CA |
| 001 | CB |

According to such a corresponding relationship, the controller 33 detects a signal change of the position detection module 34, that is, the output control driving circuit switches the driving state.

When motor speed is increased, back electromotive force (EMF) is increased accordingly. As that rotational speed of the motor approach its maximum rotational speed, the back EMF may be higher than the maximum voltage that the drive circuit may be able to supply, and the drive circuit is not able to supply sufficient energy to the motor 12 to overcome the increase back EMF.

The excitation of the rotor can be controlled by controlling a phase angle of the phase current in order to overcome the increased back EMF at higher motor speeds or when the maximum output power of the motor 12 is reached and the torque demand on the motor 12 continues to increase. Compared with the increased back EMF leading phase current, the flux generated by the permanent magnet decreases, which leads to the reduction of back EMF and torque generated by the permanent magnet.

However, when the motor is in the heavy load state, the stator winding current is larger, which will cause serious armature reaction, resulting in the phase leading angle decreases or even delay the rotor magnetic field, which cannot achieve the effect of field weakening to speed up.

Actually, due to the delay of the control signal, when the rotor rotates to the position where the driving state needs to be switched, it is generally too late to control, which will decrease the performance of the brushless motor.

In order to eliminate the delay as much as possible and make the commutation correspond to the position of the rotor, a control method of starting commutation ahead of the actual position of the rotor can be adopted.

In order to achieve the leading control, the physical position of the Hall sensor can be set, and the physical position of the Hall sensor can be set ahead of the ideal position by an angle. The position sensor is set in such a way that the position sensor is set in the range of 20° to 40° ahead of these position electrical angles. Or, in the range of 20°/P to 40°/P, where P is the number of pole pairs of the rotor of the brushless motor.

When the motor is in a heavy load state, the controller 33 controls the drive circuit 32 to connect the first phase winding, the second phase winding and the third phase winding to the power supply module according to the rotational position of the motor rotor.

Specifically, the controller controls the drive circuit 32 to connect the first phase winding and the second phase winding to the power supply positive pole and the negative terminal first, and to connect the third phase winding to one of the power supply positive pole and the negative terminal when the rotor rotates to a preset rotational position.

For convenience of illustration, defining the winding, which is initially not connected to the positive or negative pole of the power supply, among the three-phase windings is the third phase winding. It should be noted that, the first phase winding, the second phase winding, and the third phase winding are a relative concept and are not absolutely referred to. For example, when the driving state of the driving circuit is AB, the first phase winding terminal A is connected to the positive terminal 23a, the second phase winding terminal B is connected to the negative terminal 23b of the power supply module, and the third phase winding terminal C is not connected to the positive terminal or the negative electrode, so that the winding is a third phase winding.

The corresponding relationship between the driving state of the driving circuit and the connecting state of the third phase winding during one rotation period of the rotor is shown in Table 2.

TABLE 2

| Signal combination | Driving states | The third phase winding | Connection state of the third phase winding |
| --- | --- | --- | --- |
| 101 | AB | C | 23b |
| 100 | AC | B | 23a |
| 110 | BC | A | 23b |
| 010 | BA | C | 23a |
| 011 | CA | B | 23b |
| 001 | CB | A | 23a |

During one cycle of rotor rotation, the controller 33 sequentially outputs corresponding control signals to control the driving circuit so that the first phase winding, the second phase winding or the third phase winding are connected to the power supply module in accordance with the corresponding relationship of the modes shown in Table 2.

The controller 33 controls the driving circuit 32 to connect the first phase winding and the second phase winding to the positive terminal or the negative terminal respectively, to connect the third phase winding to the negative terminal when the rotor is rotated to the first preset rotational position, and to disconnect the second phase winding from the negative terminal when the rotor is rotated to the second preset rotational position. The controller 33 starts timekeeping when the rotor rotates to the first preset rotational position, and connects the third phase winding to the positive pole of the power supply when a preset period of time elapsed.

The controller 33 controls the driving circuit 32 to first connect the first phase winding and the second phase winding to the positive terminal and the negative terminal, respectively, to connect the third phase winding to the positive terminal when the rotor rotates to the first preset rotational position, and to disconnect the second phase winding from the positive terminal when the rotor rotates to the second preset rotational position. The controller 33 starts timekeeping when the rotor rotates to the first preset rotational position, and connects the third phase winding to the negative pole of the power supply when the length satisfies a preset length of time.

The drive switch is capable of conducting the electrical connection of the third phase winding to the power supply module at a predetermined duty cycle under the control of the controller. When the rotor is in the first preset rotational position and the second preset rotational position, the controller 33 controls the drive switch to conduct the electrical connection of the third phase winding to the power supply module at a varying duty cycle.

In one or more embodiments, the controller 33 controls the driving circuit so that the driving state of the driving circuit is AB, and outputs a control signal to turn on the driving switch Q6 so that the third phase winding is connected to the negative electrode 23b of the power supply. In this case, the winding A is the first phase winding, the winding B is the second phase winding, and the winding C is the third phase winding.

When the rotor is rotated to the second preset rotational position, the controller 33 controls the driving state of the driving circuit to be AC, and outputs a control signal to turn on the driving switch Q3 so that the third phase winding is connected to the positive electrode 23a of the power supply. In this case, the winding A is the first phase winding, the winding B is the second phase winding, and the winding C is the third phase winding.

When the controller 33 controls the driving state of the driving circuit to be BC, the controller outputs a control signal to turn on the driving switch Q2 so that the third phase winding is connected to the power negative electrode 23b. When the driving state of the driving circuit is BA, the controller outputs a control signal to turn on the driving switch Q5 so that the third phase winding (winding C) is connected to the positive electrode 23a of the power supply.

When the driving state of the driving circuit is CA, the controller outputs a control signal to turn on the driving switch Q5 so that the third phase winding (winding B) is connected to the negative electrode 23b of the power supply. When the driving state of the driving circuit is CB, the controller outputs a control signal to turn on the driving switch Q1 so that the third phase winding is connected to the positive electrode 23a of the power supply.

That is, the motor is reversed every 30 degrees within one cycle of the rotor rotation, and each drive switch is turned on 180 degrees. In this way, on-time of the drive switch is increased, resulting in increased field weakening effect and improved motor efficiency.

It should be noted that, the motor performs a commutation operation every time the rotor rotates through an electrical angle of 30, the third phase winding is connected to the positive or negative pole of the power supply, and the controller 33 sends a control signal to the drive circuit so that the voltage of the third phase winding varies with the position of the rotor to improve the output stability of the motor.

For convenience of description, the time during which the rotor rotates 30° is defined as a commutation interval of the motor. In the commutation interval, the controller controls the drive circuit to connect the third phase winding to one of the power supply positive pole or the negative terminal according to the rotational position of the rotor. When the rotor rotates to the first preset rotational position, the controller starts timekeeping, and when the recording time of the controller reaches a preset time length, the controller controls the drive circuit to connect the third phase winding to the negative terminal. In one or more embodiments, when the rotor rotation length reaches the preset time length, the voltage of the third phase winding, that is, the potential difference between the third phase winding and the neutral point is close to zero or zero.

Figure 5:
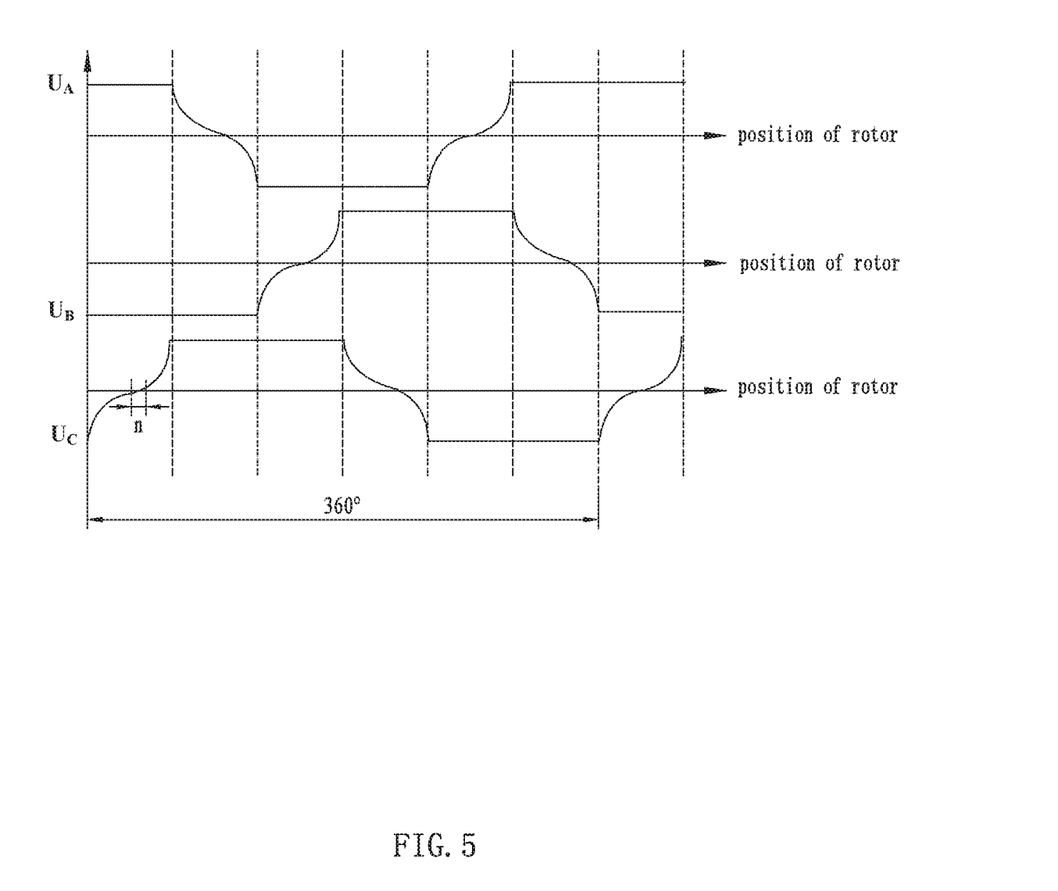
FIG. 5 is a graph showing a relationship between respective phase voltages and a position of a rotor of a brushless motor according to one embodiment.

FIG. 5 shows a plot of the phase voltages versus the rotor position of a brushless motor as one embodiment over a period of time. In this plot, the controller sends a control signal to the drive circuit so that the voltage of the third phase winding varies with the rotational position of the rotor at a varying slope. By this way, the voltage waveform of the third phase winding matches the back electromotive force waveform of the motor, thereby effectively improving the output stability of the motor.

Figure 6:
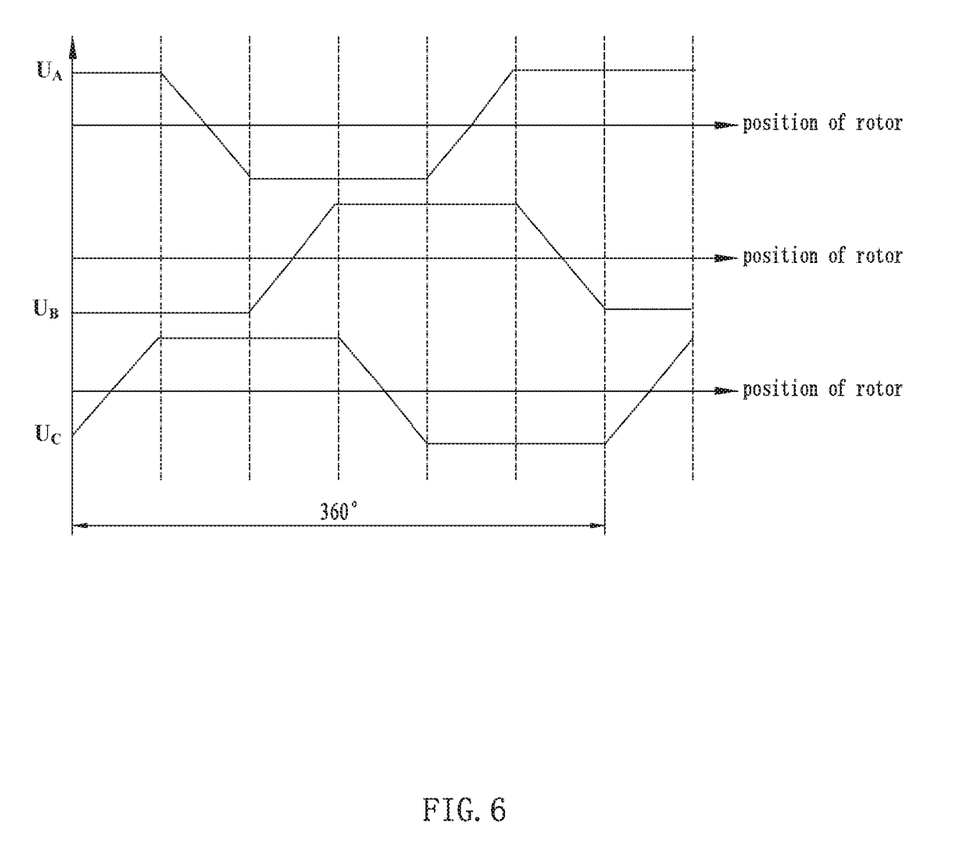
FIG. 6 is a graph showing the relationship between the respective phase voltages and the position of the rotor of a brushless motor according to another embodiment.

FIG. 6 is a graph showing the relationship between the phase voltages and the rotor position of a brushless motor as another embodiment during one cycle. In this graph, the controller sends a control signal to the drive circuit so that the voltage of the third phase winding varies with the rotational position of the rotor at a preset slope.

The controller 33 also includes a timekeeping unit for time recording and a storage unit for data processing and storage. The timekeeping unit records the time of a commutation interval. The storage unit stores the time data recorded by the timekeeping unit and the angle data of the rotation of the rotor, and establishes a correspondence table of the time data and the angle data. Assuming that the time for the rotor to rotate through the θ angle is t, the intermediate time point of the rotor position in the next commutation interval can be calculated based on the rotational angle of the rotor stored in the storage unit and the corresponding time information. The time length from the time when the rotor is rotated to the second preset rotational position to the intermediate time point can be set to a preset time length.

Figure 7:
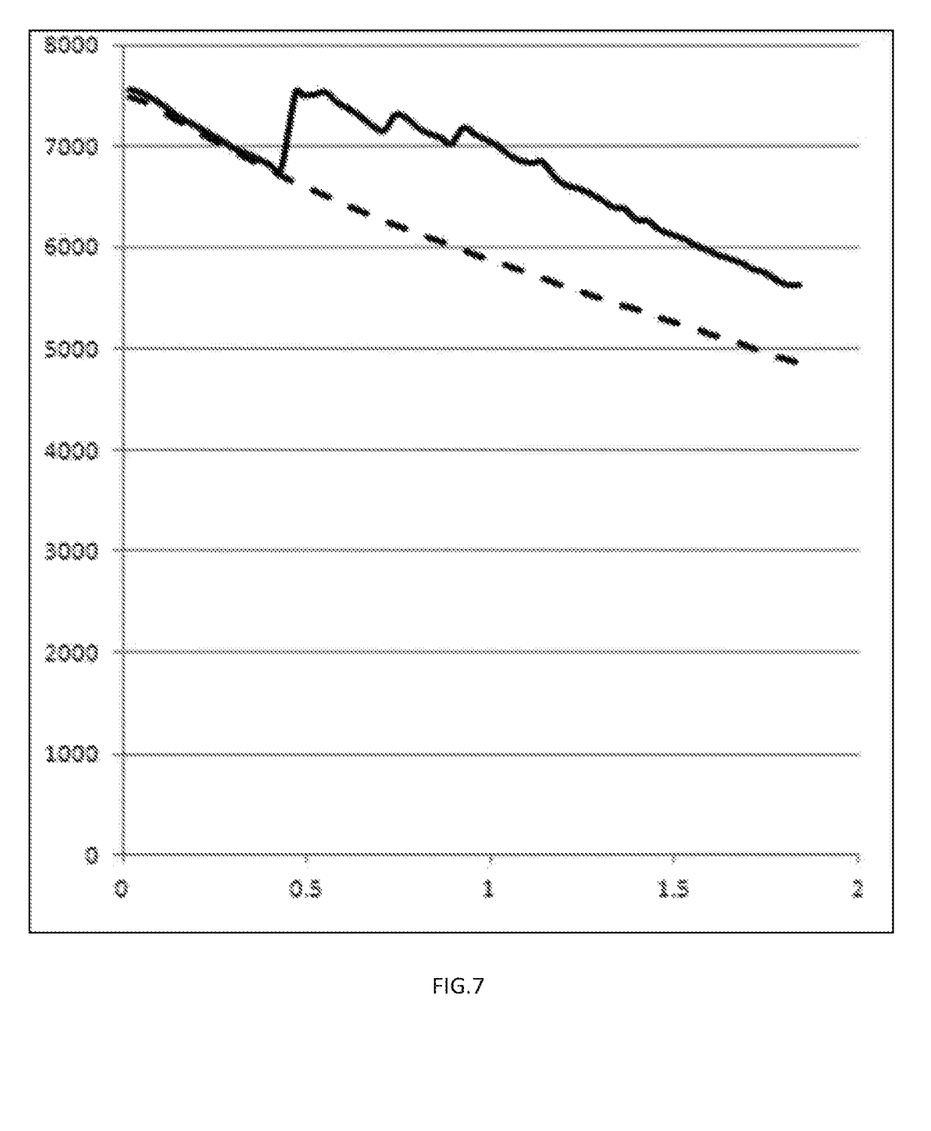
FIG. 7 is a graph of rotational speed comparison curve of a conventional power tool and a power tool according to one embodiment of the present disclosure.

Referring to the rotational speed comparison graph of the power tool shown in FIG. 7, the abscissa represents the torque, and the ordinate represents the rotational speed. The dashed line represents the variation curve of the rotational speed of the existing power tool with the torque. And the solid line represents the variation curve of the rotational speed of the power tool with the torque using the above scheme. As shown in FIG. 7, the power tool adopting the above-mentioned scheme has higher rotational speed than the existing power tool during heavy load, so that the power tool has stable output performance.

The power tools are not limited to diagonal saws, power saws, curve saws, reciprocating saws, angle grinders, cutting machines, lawnmowers and the like, and can be powered by brushless motors.

The above illustrates and describes basic principles, main features and advantages of the present disclosure. Those skilled in the art should appreciate that the above embodiments do not limit the present disclosure in any form. Technical solutions obtained by equivalent substitution or equivalent variations all fall within the scope of the present disclosure.

What is claimed is:
1. A power tool, comprising:
a motor comprising a rotor and a stator, wherein the stator has a first phase winding, a second phase winding and a third phase winding;
a power supply configured to power the motor, wherein the power supply comprises a positive terminal and a negative terminal, and is configured to generate a potential difference between the positive terminal and the negative terminal;

a drive circuit for electrically connecting the power supply to at least two of the first phase winding, the second phase winding, and the third phase winding;

a position detector for detecting a position of the rotor; and a controller configured to control the drive circuit to connect the first phase winding, the second phase winding, and the third phase winding to the power supply based on the position of the rotor detected by the position detector;

wherein the controller is configured to control the drive circuit to connect the first phase winding to the negative terminal and connect the second phase winding to the positive terminal, control the drive circuit to connect the third phase winding to the negative terminal when the rotor rotates to a first preset rotational position, and control the drive circuit to disconnect the second phase winding from the negative terminal when the rotor rotates to a second preset rotational position.

2. The power tool of claim 1, wherein the drive circuit comprises a plurality of drive switches and is operable to turn on an electrical connection of the third phase winding to the power supply at a certain duty cycle under the control of the controller;

the controller is capable of controlling the drive switches to turn on the electrical connection of the third phase winding and the power supply at a varying duty cycle when the rotor is positioned between the first preset rotational position and the second preset rotational position.

3. The power tool of claim 1, wherein when the rotor rotates to the first preset rotational position, the controller starts timekeeping, and when the time recorded by the controller reaches a preset time length, the controller controls the drive circuit to connect the third phase winding to the negative terminal of the power supply.

4. The power tool of claim 1, wherein the controller is electrically connected to the drive circuit and is configured to send a control signal to the drive circuit so that the voltage of the third phase winding varies with rotational position of the rotor.

5. The power tool of claim 1, wherein the controller is electrically connected to the drive circuit and is configured to send a control signal to the drive circuit so that the voltage of the third phase winding varies with rotational position of the rotor at a varying slope.

6. The power tool of claim 1, wherein the controller is electrically connected to the drive circuit and is configured to send a control signal to the drive circuit so that the voltage of the third phase winding varies with rotational position of the rotor at a preset slope.

7. A control method of a power tool, wherein the power tool comprises:
   a motor having a rotor and a stator, wherein the stator comprises a first phase winding, a second phase winding and a third phase winding; and
   a power supply comprising a positive terminal and a negative terminal, wherein the power supply is configured to generate a potential difference between the positive terminal and the negative terminal; wherein the control method comprises:
   connecting the first phase winding and the second phase winding to the positive terminal or the negative terminal respectively;
   detecting a position of the rotor; and
   connecting the third phase winding to the positive terminal of the power supply in response to the rotor rotating to a preset rotational position, wherein said connecting comprises: connecting the third phase winding to the positive terminal when the rotor rotates to a first preset rotational position, and disconnecting the first phase winding from the positive terminal when the rotor rotates to a second preset rotational position.

8. The control method of claim 7, wherein timekeeping is started when the rotor rotates to the first preset rotational position, and the third phase winding is electrically connected to the negative terminal when time reaches a preset duration.

9. The control method of claim 7, wherein when the rotor is positioned between the first preset rotational position and the second preset rotational position, the voltage of the third phase winding is varied with the rotational position of the rotor.

10. The control method of claim 7, wherein when the rotor is positioned between the first preset rotational position and the second preset rotational position, the voltage of the third phase winding is varied with rotational position of the rotor at a preset slope.

* * * * *